Dec. 23, 1924.                                                    1,520,524
                          C. ABANDOWITZ
                        EGG SHELLING DEVICE
                Filed May 7, 1924          2 Sheets-Sheet 1
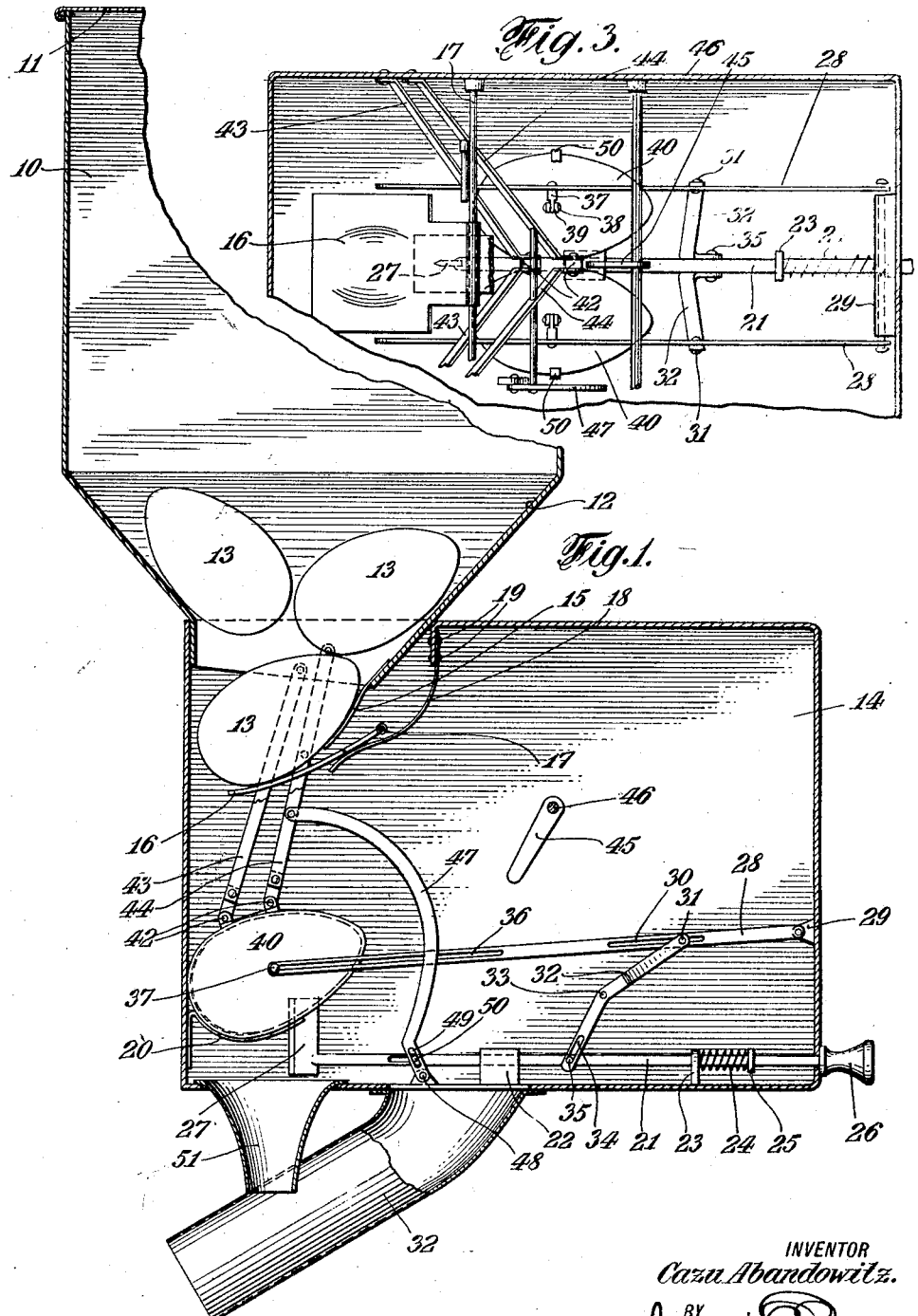
INVENTOR
Cazu Abandowitz.
BY
his ATTORNEY Dec. 23, 1924.   1,520,524
C. ABANDOWITZ
EGG SHELLING DEVICE
Filed May 7, 1924    2 Sheets-Sheet 2
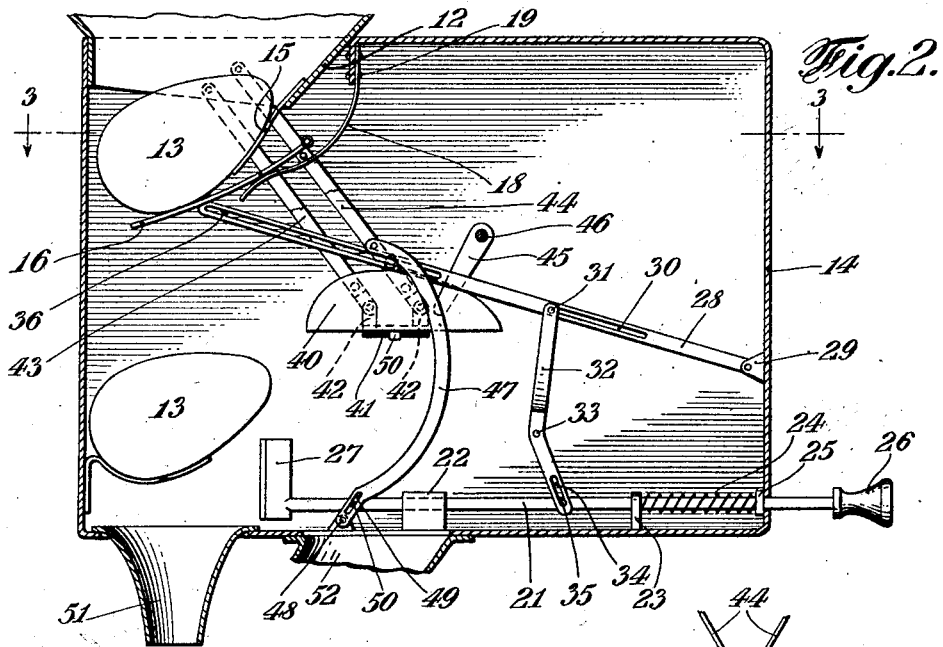
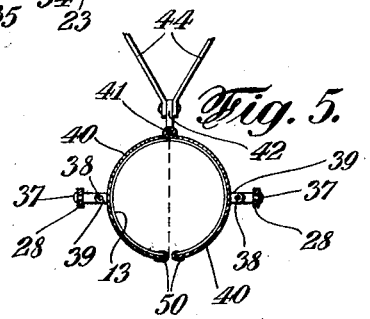
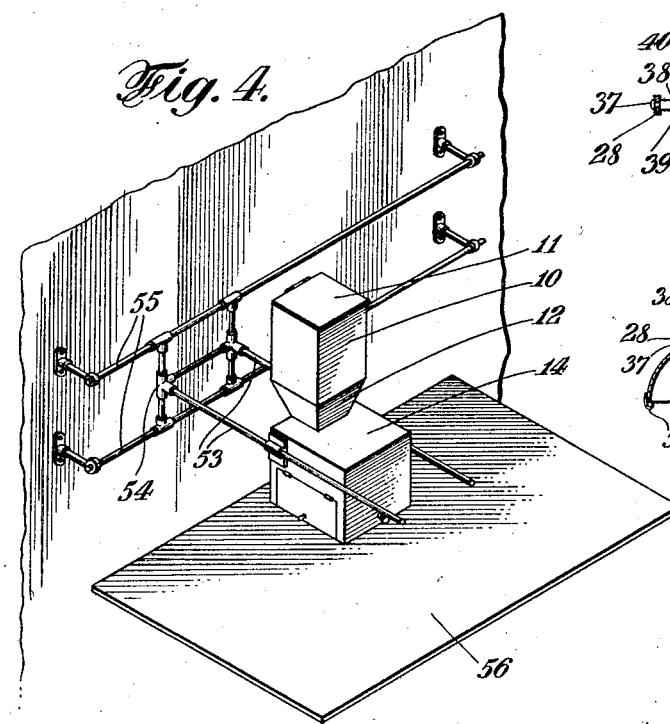
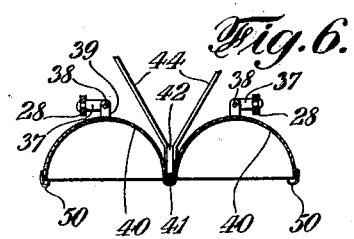
INVENTOR
Cazu Abandowitz.
BY
his ATTORNEY Patented Dec. 23, 1924.

1,520,524

UNITED STATES PATENT OFFICE.

CAZU ABANDOWITZ, OF NEW YORK, N. Y.

EGG-SHELLING DEVICE.

Application filed May 7, 1924. Serial No. 711,562.

*To all whom it may concern:*

Be it known that I, CAZU ABANDOWITZ, a citizen of Danzig, residing at New York, in the county of New York and State of New York, have invented certain new and useful Improvements in Egg-Shelling Devices, of which the following is a specification.

This invention relates to improvements in devices for removing the shells from eggs and has as its principal purpose to provide an apparatus comprising a receptacle for holding the eggs in bulk and from which they are delivered, one at a time, to a mechanism which removes the shell and delivers the contents intact into a container for such purposes as may be required.

Another purpose is to produce a device in which the egg and its shell are delivered simultaneously outward, at a single movement of a hand actuated plunger into separate containers.

A further aim is in the provision of an apparatus particularly designed for the use of restaurants, hotels and like places where eggs are used in large quantities and which require expeditious service.

These and like other objects are attained by the novel construction and combination of parts hereafter described and shown in the accompanying drawing forming a material part of this disclosure, and in which:—

Figure 1 is a vertical sectional view of an embodiment of the invention.

Figure 2 is a similar view of the same, the parts being shown in the normal retracted position.

Figure 3 is a transverse sectional view taken on line 3—3 of Figure 2.

Figure 4 is a perspective view illustrating the container in which the egg matter is received and its supports.

Figure 5 is a transverse sectional view of the shell gripping device, the same being shown in a closed position.

Figure 6 is a similar view of the same, the grippers being shown in a spread or open position.

Referring more in detail to the drawings, the numeral 10 designates in general, a container, the same having a hinged cover 11 and has contracted walls 12 at its lower part, into which the eggs, generally designated by the numeral 13, gravitate.

The lower end of the container extends into an opening in the top of a rectangular casing 14, the eggs being gently deposited, by means of a flat spring 15 secured to the inside of one of the walls 12, to a plate 16.

This plate is pivoted at 17 to the side wall of the casing 14 and held in raised receptive position by a flat spring 18 fixed to an inreaching extension 19 of the cover of the casing 14.

As the eggs are released from the plate 16 they pass down to rest upon a pair of curved plates 20, slightly spaced apart and fixed to the end wall of the casing 14.

A bar 21, guided in supports 22 and 23, fixed to the bottom wall of the casing 14, is pressed normally outward by a coiled compression spring 24, abutting respectively the supports 23 and collar 25 fixed on the bar, the outer, extending end of which is provided with a knob 26 for manual actuation.

At the inner end of the bar is a slicer 27 adapted, as it is pressed forward, to separate the shell of an egg, resting in the plates 20, into two longitudinal halves along their bottoms.

A pair of levers 28 are pivoted on a lug 29 fixed on the inner side of the casing 14, above the bar 21, to swing up and down therein.

Said levers 28 contain elongated slots 30 in which pins 31 operate, these pins being fixed in the upper ends of a bent lever 32, pivoted at 33 to the casing sides and having at their lower ends slots 34 receptive of pins 35 fixed in the bar 21 and by which the position of the lever bars 28 is controlled.

Other, longer slots 36 in the outer portions of the levers 28 have engaged in them studs 37 hingedly pivoted, as at 38, to lugs 39 extending centrally outward from the convex surfaces of the shell separators 40.

Said separators are concavo-convex in shape, conforming to an ordinary egg shell in contour, and are connected by a hinge 41, the pairs and sides being alike in all respects.

Extending from one of the hinge members are a pair of upstanding lugs 42 having pivotally engaged the lower ends of two pairs of links 43 and 44 pivoted to the side walls of the casing 14, thus permitting the elements 4 to assume the position shown in Figures 1 and 2, the inner position, as in Figure 2, being limited by the stop 45 actuated by the spindle 46.

Pivotally attached to the links 44 are curved arms 47 engaged by pivots 48 to lugs raised from the floor of the casing 14 and containing slots 49 in which operate pins 50 fixed in the bar 21.

The edges of the elements 40 are provided with upturned fingers 50 adapted to engage the edges of the egg shells when separated by the slicer 27, spreading the shell apart and allowing the matter contained in the egg to drop by gravity into a funnel 51 passing through the bottom of the casing to conduct the egg material to a container provided to receive it.

This action takes place when the plunger is advanced and upon its retraction, the egg shell is raised and deposited in position to enter the chute 52 to be conveyed outwardly of the casing.

As shown in Figure 4, the apparatus may preferably be disposed on a pair of parallel rods 53 carried by a frame, generally designated by the numeral 54 and movable longitudinally on rails 55.

Thus the apparatus can be moved to any desired position over a plate 56, which plate may be heated and thus deliver a plurality of cooked eggs in an expeditious manner.

Although the foregoing has been fully described in the preferred embodiment of its invention, it is understood that minor changes in its construction, combination and arrangement of parts may be made without conflicting with the claims hereto appended.

Having thus described my invention, what I claim as new and desire to secure by Letters Patent, is:—

1. An egg shelling apparatus comprising a casing, means for delivering a single egg upon a support, a slicer to cut the shell, a gripping device engageable with the egg shell, and means for conveying the shell outward of the casing.

2. An egg shelling apparatus comprising an egg receptacle, a casing therebelow, a bifurcated support in said casing, means permitting a single egg to pass from said receptacle to the support, a spring retracted plunger bar movable in said casing, a slicer carried by said bar adapted to pass into the bifurcated support and sever the shell of an egg thereof, a gripper engageable with the shell of the egg, means actuated by said plunger for removing the shell to another part of said casing, a funnel below said support, and a chute adapted to convey the shell outwardly from said casing.

3. The combination with an apparatus for removing shells from eggs, of a frame carrying said apparatus, said frame permitting both lateral and longitudinal movement, and a plate over which the apparatus can be moved.

4. An egg shelling apparatus comprising in combination with a slotted support receptive of a single egg and means for slicing the lower portion of the shell of the egg, of a pair of opposed grippers suited to engage the shell, fingers on the lower edges of said grippers adapted to enter between the severed portion of the shell, means for opening and closing the gripper elements, and means for raising said gripper elements simultaneously with the retraction of said slicing means.

In witness whereof I have affixed my signature.

CAZU ABANDOWITZ.